Sept. 22, 1959 T. F. GOSSARD 2,905,936

MEMORY DELAY UNIT

Filed Jan. 27, 1954 5 Sheets-Sheet 1

INVENTOR.
THOMAS FISHER GOSSARD

BY

Ostrolenk and Faber

ATTORNEYS

Sept. 22, 1959 T. F. GOSSARD 2,905,936

MEMORY DELAY UNIT

Filed Jan. 27, 1954 5 Sheets-Sheet 2

INVENTOR.
THOMAS FISHER GOSSARD

BY

Ostrolenk and Faber
ATTORNEYS

INVENTOR.
THOMAS FISHER GOSSARD

BY

Ostrolenk and Faber
ATTORNEYS

INVENTOR.
THOMAS FISHER GOSSARD

By Ostrolenk and Faber
ATTORNEYS

Sept. 22, 1959 T. F. GOSSARD 2,905,936

MEMORY DELAY UNIT

Filed Jan. 27, 1954 5 Sheets-Sheet 5

INVENTOR.
THOMAS FISHER GOSSARD

BY

Ostrolenk and Faber

ATTORNEYS 2,905,936

Patented Sept. 22, 1959

2,905,936

MEMORY DELAY UNIT

Thomas F. Gossard, North Hollywood, Calif., assignor to Standard Coil Products Co., Inc., Los Angeles, Calif., a corporation of Illinois Application January 27, 1954, Serial No. 406,449

5 Claims. (Cl. 340—348)

The present invention relates to a memory unit and more particularly it relates to a memory unit capable of delivering pulses with a preset delay.

It is known in the art that memory units are used for storing signals in the correct sequence as they are received by the memory device. The memory device must be capable of delivering the received pulses to other circuits after their reception from the source of these pulses.

Well known memory devices are exemplified by the magnetic tape memory unit, magnetic drums or saturable cores.

These memory devices, in adidtion to receiving and storing pulses must be reliable or, in other words, they must be capable of receiving any pulses that are introduced in the memory unit and be capable also of reproducing them at the right time. In addition, it is often desirable to reproduce the received pulses at a time later than the one at which the pulses were received or, in other words, it is often found necessary to produce a time delay in the reproduction of these pulses.

It is found, for example, necessary to have memory delay units having a memorizing or receiving device capable of accepting pulses of a given amplitude and having durations within a certain time range.

It is also necessary for the memory delay unit to memorize the time sequence of the incoming pulses and to subsequently produce not one but more than one, for example two pulses, for each one received.

Between reception and production of pulses it may be necessary to have a desired time delay that is easily controllable by the oscillator of the memory delay device. Such memory deviecs are also required to deliver output pulses of considerable amplitude, for example one ampere or more.

The present invention consists then of a memory delay unit meeting all of the above-mentioned requirements and capable of memorizing input pulses at a fairly low rate, for example a few pulses per second.

The present memory delay unit receives the pulses by a combination of electric and mechanical operations of its movable parts and the time delay desired is determined by the position of the output elements with respect to signal operated members.

To be more specific, in the memory delay unit of the present invention an electromagnet serves as the receiving element for the incoming pulses. These pulses which may have a rate of approximately two pulses per second or less energize the electromagnet every time they occur so as to cause the electromagnet to remove its armature from the path of memory elements mounted on the disc rotatable with respect to the electromagnet.

These memory fingers or memory devices are pivoted along the circumference of the previously mentioned rotatable disc and their angular position around their pivot determines at what time a pulse is received by the electromagnet since when no pulse is received by the electromagnet during the travel of one of these memory fingers along a section of the armature of the electromagnet, then the memory finger is practically flattened against the previously mentioned rotating disc while if a pulse occurs at the time at which the memory finger is positioned radially with respect to the rotating disc, then the memory finger will retain this radial position due to the fact that no mechanical opposition is presented by the armature of the magnet as the magnet is being energized by a pulse and the memory finger is now, therefore, free from the armature of the electromagnet and may now be caused to close a predetermined number of stationary switches mounted around the circumference of the rotating disc.

In order that the memory fingers may all have the same initial position when they come first in contact with the armature of the previously mentioned electromagnet, a restoring device is provided which with the aid of a single gearing system causes one memory finger at a time to acquire a certain predetermined or desired initial position regardless of the previous history to which these memory fingers have been subjected in previous operations.

In addition, in order to remove the possibility that a pulse may arrive when one of the memory fingers is practically ready to slide off the armature of the electromagnet while a second memory finger has just come in contact with the armature of the electromagnet since a pulse at this time would result in the positioning of two memory fingers instead of one, the present invention provides a stopping plate capable of stopping the second memory finger during an incoming pulse so that only the first finger will retain the impression of the reception of a pulse by the electromagnet.

Accordingly, one object of the present invention is a memory unit capable of delaying received pulses by a predetermined time.

Another object of the present invention is a memory device capable of receiving and memorizing input pulses having a specified duration and repetition rate.

Still another object of the present invention is a memory device provided with means so that no single input pulses may be memorized twice.

As previously mentioned, mounted stationarily but around the rotating disc are a series of switch members engageable by the memory fingers or more specifically the switching elements are so positioned that some of them will be engaged by the memory fingers at a fairly small time delay from the time at which the incoming pulse was received by the memory unit while some others will be engaged by the memory fingers after longer time delays where, of course, the time delays are determined by the position of these switching elements around the rotating disc, the number of memory fingers mounted on the rotating disc and the speed of rotation of the rotating disc.

If the switching elements are mounted so that each pair of them represents a certain time delay and since the memory finger will come in contact with the two switches at approximately the same time delay, two pulses will be generated for each incoming pulse with that given time delay.

Actually, of course, one switch will be operated before the other so that the resulting pulses may be displaced any time by a certain time interval.

Therefore, another object of the present invention is a memory unit capable of delivering two pulses for each input pulse at a given time delay.

The foregoing and many other objects of the invention will become apparent in the following description and drawings in which.

Figures 7, 8, 9, 10:
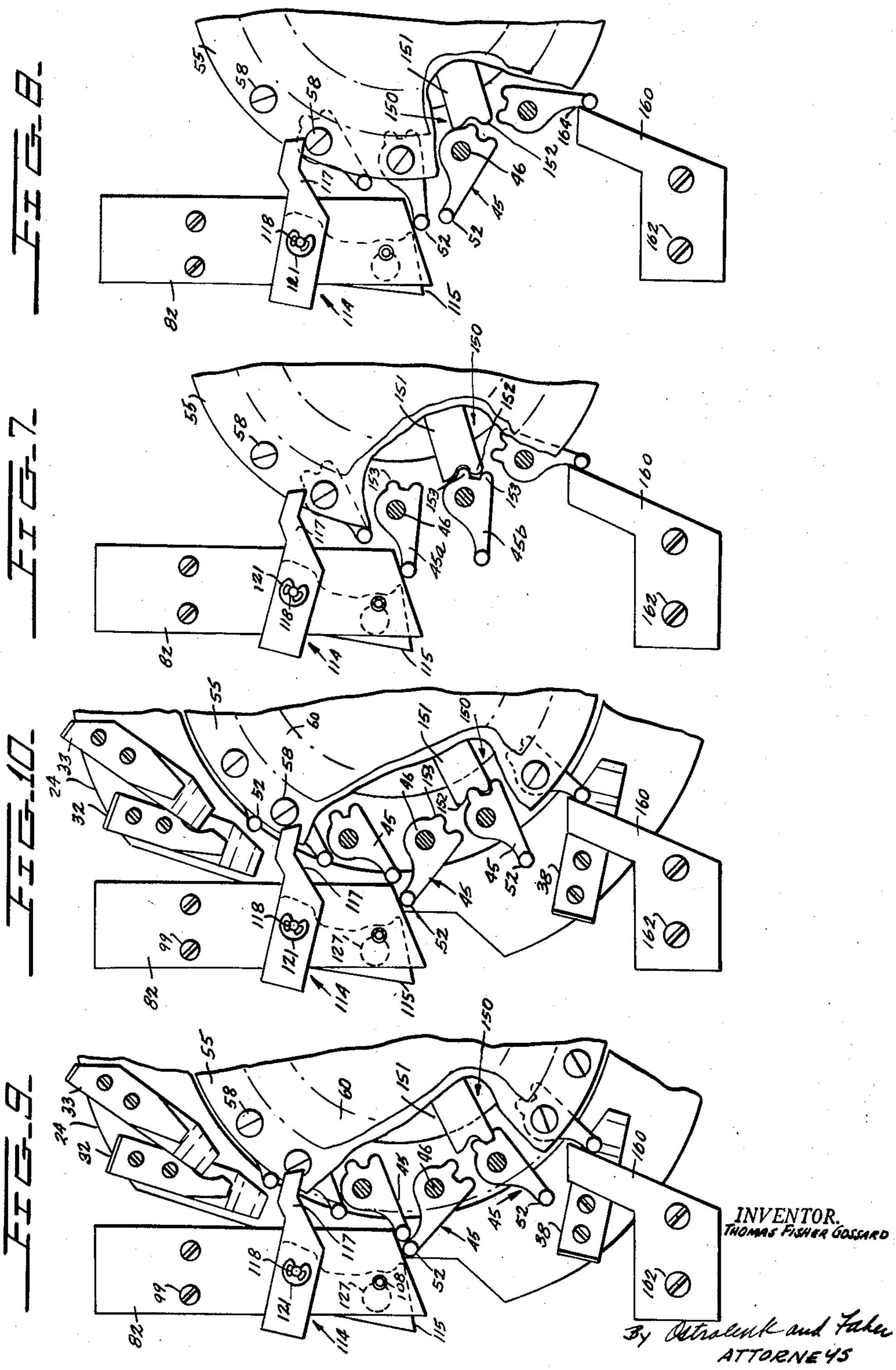
Figure 7 is a detail view of the memory unit showing the relative position of the memory fingers as one of them engages the armature of the electromagnet.
Figure 8 is the same detail of Figure 7 of the memory unit of the present invention showing now the memory finger after a certain time interval has elapsed since its engagement with the armature of the electromagnet.
Figure 9 is the same detail of Figure 7 of the memory unit of the present invention showing the position of the memory fingers after a time interval has elapsed from the position shown in Figure 8 and showing how a second memory finger is now engaging the armature of the electromagnet before the disengagement of the first one from this armature.

Figure 10 is a detail drawing similar to that of Figure 7 of the memory unit of the present invention showing the first memory finger slipping by the armature of the electromagnet, thus indicating that no pulse has been received by the memory unit during the time at which the first memory finger was in engagement with the armature and showing the second memory finger now taking over the function of receiving pulses.

Figure 1:
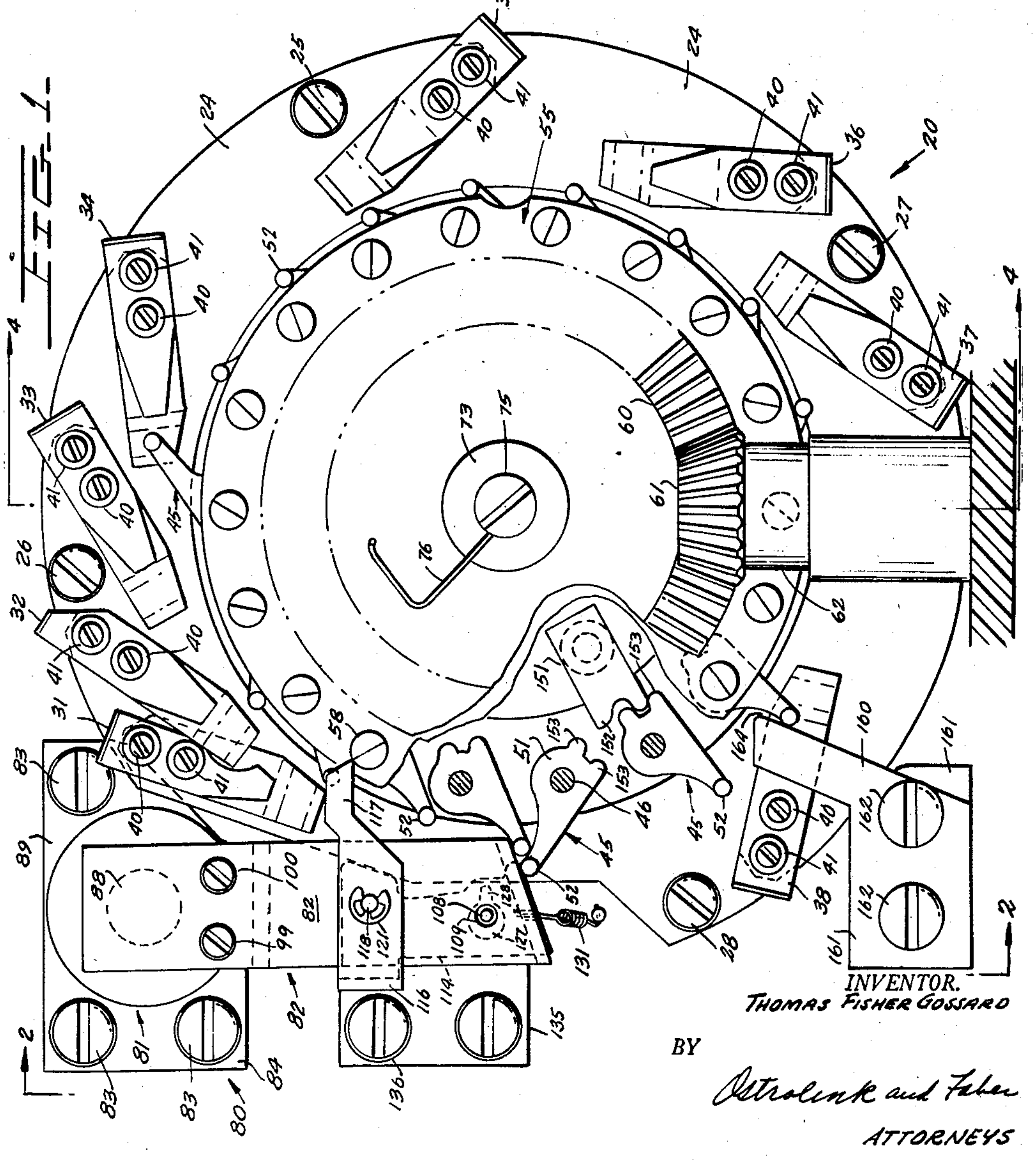
Figure 1 is a plan view of the memory unit of the present invention showing the operation of the stopping plate and of the restoring element.
Figure 11:
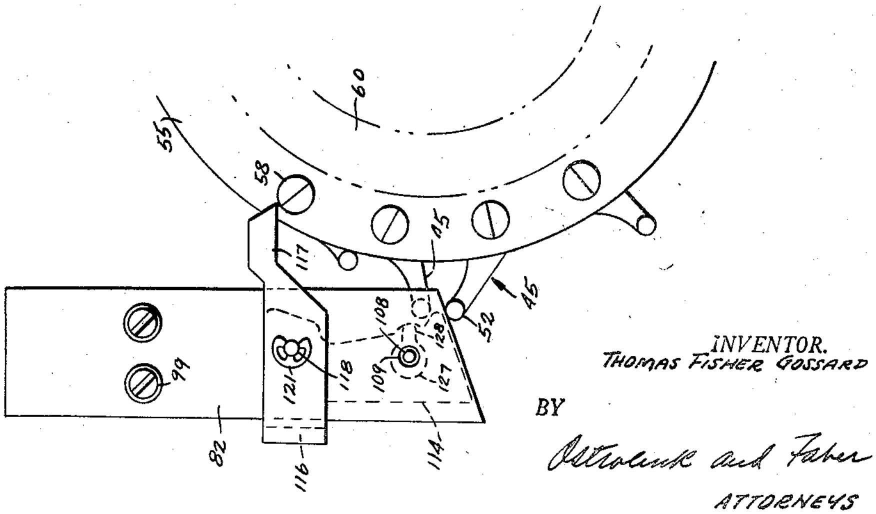

Figure 11 is a detail similar to that of Figure 7 of the memory unit of the present invention showing the position of the memory finger after a time interval has elapsed since the arrival of a pulse when the memory unit was in the position shown in Figure 1 an1 more particularly showing the operation of the stop plate in retaining the second finger against its tendency to follow the first one due to reception of a pulse.

Figure 12:
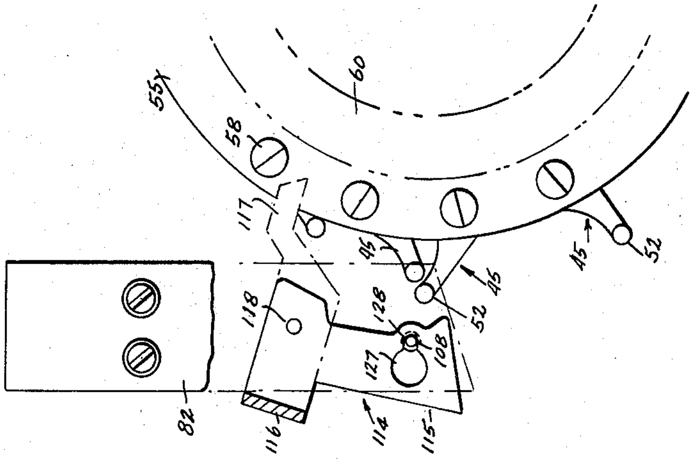

Figure 12 is another detail similar to that of Figure 7 of the memory unit of the present invention showing the memory unit after a time interval has elapsed since the reception of a pulse when the memory unit was in the position shown in Figure 9; two memory fingers have been here affected by the incoming pulse.

Figure 13:
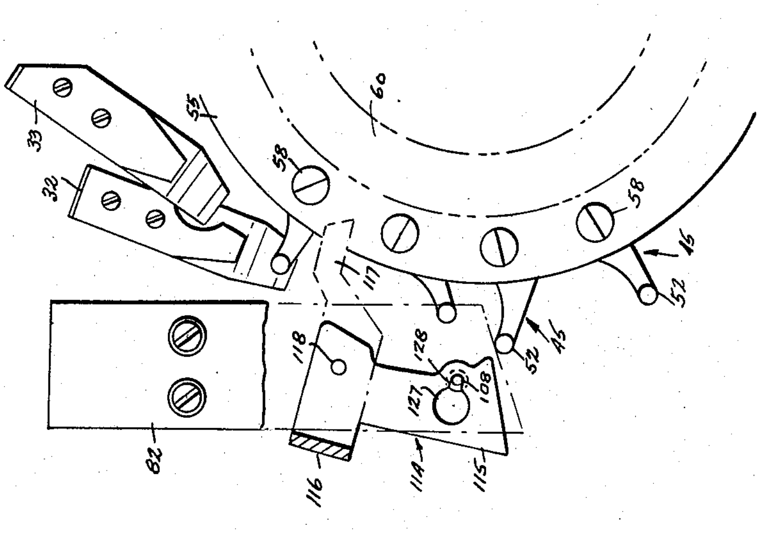

Figure 13 is another detail view similar to that of Figure 7 of the memory unit of the present invention showing the position of the memory unit after a time interval has elapsed since the arrival of an input pulse at the time at which the memory unit was in the position shown in Figure 7; the first memory finger is here leaving the armature having retained the impression by the pulse while the second has just begun its engagement with the armature of the electromagnet.

Figure 2:
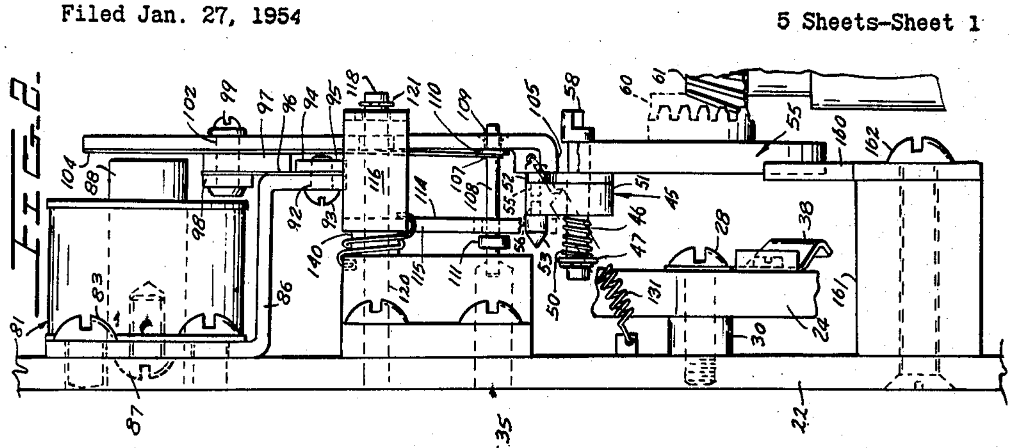
Figure 2 is a side view of the memory unit of the present invention taken from line 2—2 looking in the direction of the arrows of Figure 1 and showing the electromagnet in its rest or inoperative position.
Figures 4, 5:
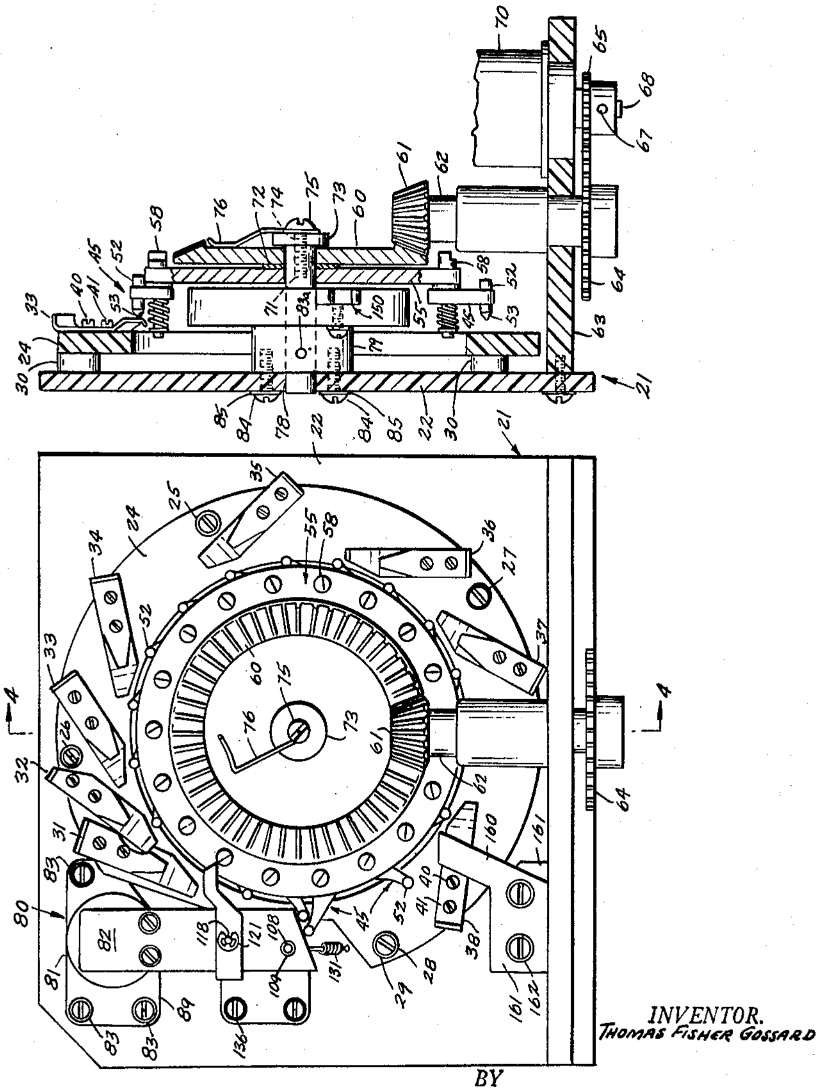
Figure 4 is a cross-sectional view of the memory unit of the present invention taken at line 4—4 looking in the direction of the arrows of Figure 1.
Figure 5 is a plan view of the memory unit of the present invention similar to Figure 1 but with no cut-outs showing the position acquired by the memory fingers when no pulse up to the moment shown in the figure has been received.

Referring now to Figures 1 and 2 showing the memory unit in its unoperated position, that is when no pulse is received by the memory unit, memory unit 20 is mounted on an L-shaped base member 21 shown more clearly in Figure 5. On plate 22 of the L-shaped member or stand is mounted the ring-shaped member 24 through screws 25, 26, 27 and 28. Screws 25, 26, 27 and 28 as shown more clearly in Figure 2 are provided with a washer 29 positioned between the head of the screw 28 and ring-shaped member 24 and with a positioning sleeve or separator 30 between ring-shaped member 24 and base plate 22 of stand 21.

On this ring-shaped member 24 are mounted a series of switches 31, 32, 33, 34, 35, 36, 37 and 38 where these switches 31 to 38 as can be seen in both Figures 1 and 5 may have their longitudinal axes at different angular positions with respect to a radius of the ring-shaped member 24.

It will be noted that switch members 31 to 38 are mounted on the ring-shaped member 24 by means of pairs of screws such as 40 and 41. Switch members 31 to 38 constitute one contact of a complete switch, the other contact being provided by the 18 fingers 45.

Figure 3:
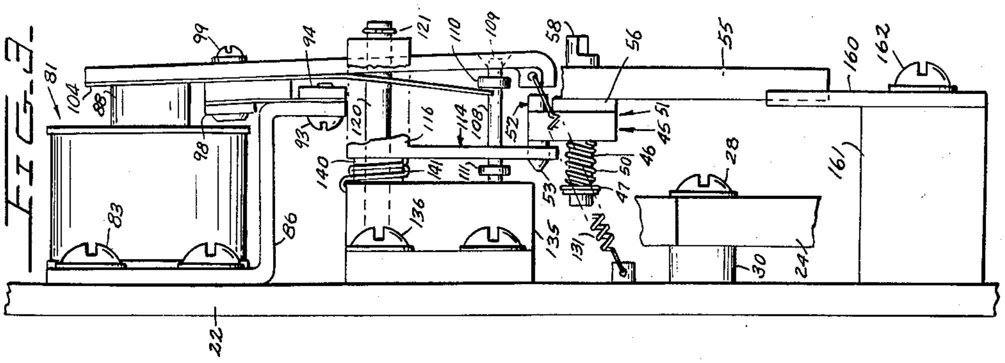
Figure 3 is a side view similar to Figure 1 but showing the electromagnet in its actuated position due to the reception of an input pulse.

Each finger 45, as can be seen in Figures 1, 2 and 3, is pivoted on a shaft 46 provided at one of its ends with a washer 47 so that a spring 50 may be positioned between finger 45 and washer 47 to bias finger 45 in its upper position.

Actually, memory fingers 45 comprise three members, one having the particular shape shown in Figure 1 and denoted by numeral 51, which is engaged by shaft 46 and is pivoted around shaft 46, and two members essentially cylindrical, 52 and 53, mounted at the fingerlike extension of member 51 on each side of member 51, parallel to shaft 46.

Cylindrical members 52 and 53 are mounted on member 51 by the provision of threaded extensions 55 and 56, respectively, for members 52 and 53 so that the threaded extensions 55 and 56 can engage appropriately threaded openings in member 51 and, therefore, take the position shown clearly in Figure 2. Member 52 serves to engage a portion 105 of armature 82, described hereinafter, while member 53 is the other switch contact for the switch means 31—38 and serves also to engage in certain positions a stop plate 114 as also described hereinafter.

Shaft 46 also engages rotatable disc 55 against which member 51 of memory finger 45 is biased since only a washer 56 is interposed between member 51 of memory finger 45 and rotating disc 55. Shaft 46 extends through rotating disc 55 and is terminated by cut-out portion 58 where cut-out portion 58 does not necessarily have to be an integral part of shaft 46 but may be mounted thereon in any appropriate way. Thus, fingers 45, as can be seen in Figures 2, 3 and 4, are suspended from disc 55.

Mounted above member 55 is a bevel gear 60 engaged by gear 61 mounted on shaft 62 which carries at its opposite end extending on the other side of portion 63 of stand 21 a gear 64 engaged by a gear 65 mounted by appropriate keys such as 67 on shaft 68 of a driving motor 70.

It should be noted that gear 60 and disc 55 are both mounted for rotation with respect to the same shaft 71 with only a spacer 72 interposed between gear 60 and rotating disc 55. Shaft 71 engages at one end a bloc 79 to which it is secured by appropriate means such as a key 83 engaging bloc 79 and shaft 71. Bloc 79, in its turn is secured to the base 22 by means of screws and washers 89 and 85. Shaft 71 is provided at the end extending beyond bevel gear 70 with a bent over portion 73 and a centrally positioned threaded hole 74 engaged by screw 75.

Between the head of screw 75 and the flat top portion 73 of shaft 71 is located a wire spring member 76 where the wire spring member 76 is biased against the central flat portion 77 of bevel gear 60. Bevel gear 60 and disc 55 have, of course, a centrally positioned opening for the shaft 71 which is press fitted so that rotation of bevel gear 60 is accompanied by a rotation of shaft 71 and disc 55.

Figure 6:
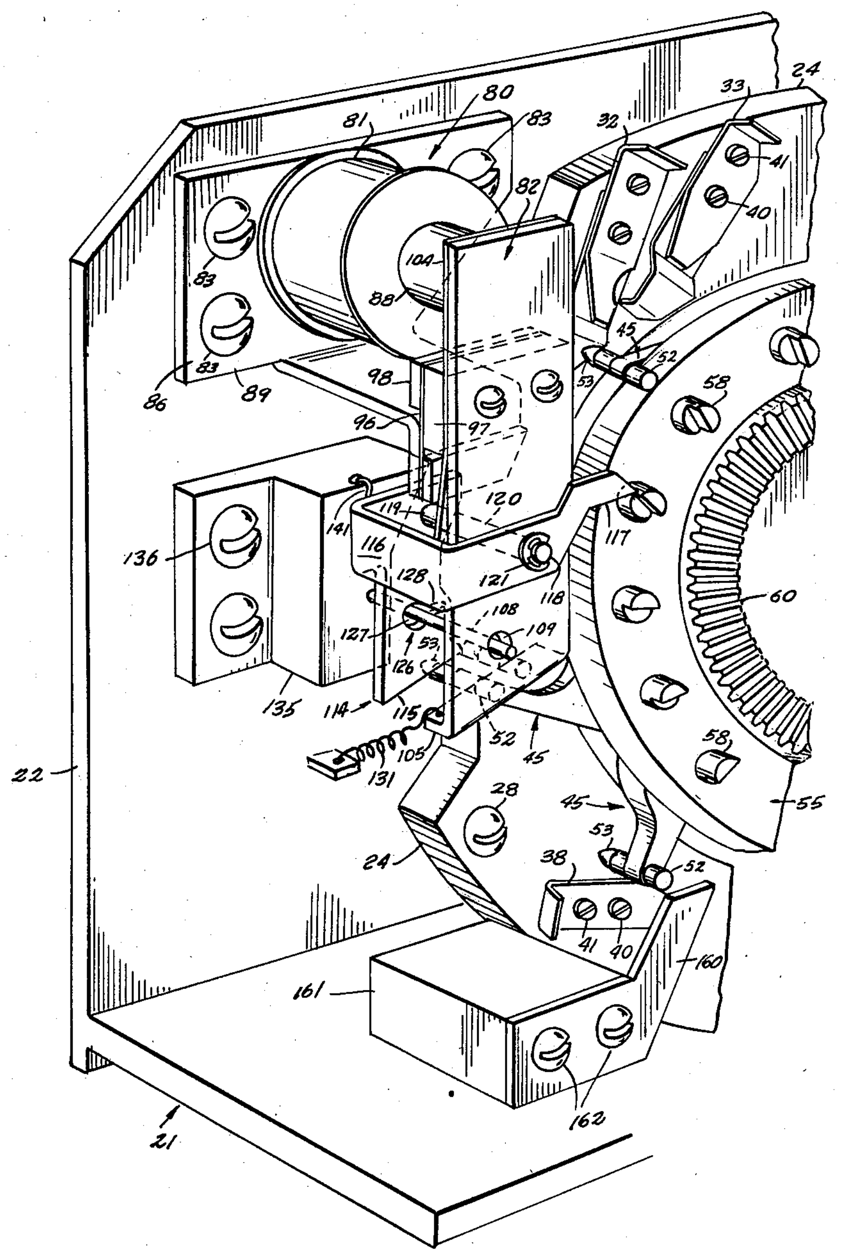
Figure 6 is a perspective view of a detail of the memory unit of the present invention showing the relationship between the electromagnet, its armature and the stop plate.

Mounted stationarily on base 22 of stand 21 is electromagnet 80, see Figure 6, consisting of solenoid 81 and armature 82. Solenoid 81 is mounted to an S-shaped member 86 by means of a screw 87 engaging both the S-shaped member 86 and the center core 88 of solenoid 81.

In its turn, S-shaped member 86 is mounted to base 22 of stand 21 by means of screws 83 engaging wider portion 89 of S-shaped member 86 as shown in Figures 1, 5 and 6.

Base 22 of stand 21 must be provided with an opening to permit the head of screw 87 to extend partially into base 22 of stand 21. The other end of S-shaped member 86 is provided with an opening 92 engaged by a screw 93 which also engages a block 94 having an appropriately threaded hole 95, hole 95 being then engaged by screw 93.

Between block 94 and S-shaped member 86 is a resilient flat member 96 which carries at its end opposite to the one at which it is secured to S-shaped member 86 two more blocks 97 and 98 (see also Figure 6) between which is positioned the leaf spring 96 and which are engaged by bolts and nuts 99 and 100, respectively, and secured to armature 82 of electromagnet 80 through appropriate openings 102 in armature 82.

Actually, block 97 also serves to flatly position a second leaf spring 104 against the lower face of armature 82. Leaf spring 104 extends along armature 82 and terminates just before the bent portion 105 of armature 82 in an opening 107 engaged by a pin 108 which passes through the opening 107 and a concentric opening 109 in armature 82 with a fixed washer 110 positioned between spring 104 and armature 82 (see Figure 2).

Pin 108 has at its other end a similar washer 111 positioned on the other side of stop plate 114. Stop plate 114 is provided with a base portion 115 and a U-shaped portion 116 integral with the base portion 115 and extending transversely with respect to armature 82 of electromagnet 80. This extension 116 terminates with a finger 117 appropriately pointed as can be clearly seen in Figures 1, 5 and 6.

Member 115 is also provided with openings at both sides of armature 82 of electromagnet 80 shown at 118 and 119 to permit the positioning there of a pin 120. Base plate 115 of member 114 is provided with a slot 126. Slot 126 has a circular portion 127 and an elongated portion 128. Armature 82 which as mentioned above faces directly member 114 is mounted for angular movement around a pivot constituted by a portion of leaf spring 96 positioned between block 98 and S-shaped member 86.

Angular motion of armature 82 occurs when solenoid 81 is energized, for example, by an incoming pulse. The other end of armature 82 is provided with a bent over portion 105 engaged at one end by a spring 131, the other side of which is fixedly secured to the base plate 22 of stand 21. Armature 82 is also provided with a circular opening 109 in alignment with the circular portion 127 of slot 126.

A pin 108 is secured to base 135 which is in its turn mounted on base 22 by means of screws 136. Openings 109 and 127 are sufficiently larger than the cross-section of pin 108 so as to permit a certain amount of movement of armature 82 and stop plate 114 with respect to pin 118.

Also fixedly mounted on base 135 is the previously mentioned pin 120. Washer 121 engaging one end of pin 120 serves to retain pin 120 against axial motion. Pin 120 is not rotatable but U-shaped member 116 and, therefore, the whole stop plate 114 may rotate around pin 120.

Between base plate 114 and base 135 and concentric with pin 120 is a positioning cylinder or sleeve 140 which serves to correctly position stop plate 114 with respect to the base 135. Wound around sleeve 140 is a spring 141 which in Figures 1, 2 and 6 is in its operated or stretched position due to the engagement of finger 117 of stop member 114 with the head 58 of pin 46.

In other words, in the above-mentioned figures, stop plate 114 is shown in one of its extreme positions, namely, in the position at which the spring is more strongly under tension. When due to continued rotation of disc 55, pin 45 goes out of engagement with finger 117, stop plate 114 will return to its other extreme position under action of restoring spring 141.

Spring 131 engaging and biasing in the unoperated position armature 82 functions also as a restoring spring to restore armature 82 to its unoperated position after each energization of solenoid 81 due to incoming pulses.

To be more specific, every time a pulse is introduced in solenoid 81 and energizes solenoid 81, armature 82 is caused to rock around the previously mentioned pivot 97 against the bias of spring 131.

At the end of the pulse and de-energization of the solenoid 81, armature 82 under action of spring 131 returns to its original position through the same angular rotation. It should be noted that openings 109 and 126 are so shaped as to permit movement of armature 82 and plate 114, respectively, relative to pin 108.

It is now possible to describe the operation of the memory device of the present invention.

During operation of this memory device, motor 70 is energized so as to drive through gears 65—64 and 61—60 disc 55 carrying the switch fingers or members 45. Motor 70 is caused to rotate at a speed such that if, for example, the input pulses cannot arrive at a speed in excess of two per second, fingers 45 will be less than half a second apart so that as seen hereinafter no input pulse may be introduced in the memory device without being detected.

During rotation of disc 55, fingers 45 may engage portion 105 of armature 82 and if armature 82 is not operated, finger 45 (see for example Figure 1) will rotate around a pin 46 until (see Figure 10) finger 45 is so rotated that it slides off the end of portion 105 of armature 82.

It should be noted that before the disengagement of finger 45 from armature 82 due to rotation of finger 45 around its pin 46, a second finger 45 is caused to engage portion 105 of armature 82. In Figure 1, for example, two fingers are shown engaging at the same time armature 82. If at the time at which fingers 45 are positioned as shown in Figure 1 a pulse is introduced in solenoid 81, armature 82 will move against the bias of restoring spring 131 as shown in Figure 3, thus going out of engagement with finger 45 or better out of engagement with pin 52 of finger 45 and thus permitting finger 45 to slide under the raised armature 82.

Finger 45 will retain this angular position due to the positioning spring 50 mounted on pin 46 and will subsequently engage the stationary switch members 31 to 38, thus producing an output pulse.

The second finger 45 will not follow the previous finger or, in otherwords, will not pass under raised armature 82 since stop plate 114 is now caused to be in its extreme operative position due to engagement of its finger 117 with the head 58 of pin 46 of a previous pin. The operated position of plate 114 causes engagement of plate 114 with a pin 53 of finger 45.

While, therefore, finger 45 attempts to follow the previous finger and pass under armature 82, this is impossible for the second finger 45 due to the particular position now occupied by stop plate 114.

After the pulse has terminated energization of solenoid 81 and after finger 117 goes out of engagement with head 58 of pin 46 due to the cut-out portion of head 58 to cause return of stop plate 114 to its original unoperated position, the second finger 45 will also be engaged solely by armature 82 so that if now a pulse should be introduced in solenoid 81, the pulse will cause armature 82 to be raised and permit passing of the second finger 45 to cause another series of pulses by engagement of second finger 45 with the stationary switch members 31 to 38.

These occurrences are clearly shown in Figures 7 to 13. In fact, Figure 10 shows stop plate 114 after its return to its unoperated position under the restoring action of spring 141 due to the disengagement of its finger 117 with head 58 of pin 46.

In Figure 10 a first contact or switch finger 45 is shown on the verge of passing by portion 105 of armature 82 without having been operated. An unoperated finger, as is clearly shown in Figure 10, will not be able to engage the stationary switch members 31 to 38.

In the same Figure 10, the second switch 45 is now shown only in engagement with armature 82, stop plate 114 having returned to its unoperated position. Figure 11 shows, on the other hand, the armature 82 in its operative position after it has allowed the passing of a first finger 45 due to energization of solenoid 81.

In Figure 11, the stop plate 114 is rotated to practically its extreme operated position and although armature 82 is now raised, the second pin 45 may not go under armature 82 since it is positioned now by stop plate 114 through its end plate 115.

It should be noted that due to rotation of disc 55 between positions of finger 45 shown in Figures 1 and 10, a condition such as shown in Figure 9 occurs where finger 117 of stop plate 114 has already disengaged from extension 54 of pin 46 but the two fingers 45 which are in engagement with portion 105 of armature 82 still engage that portion.

Then Figure 10 shows the condition after that shown in Figure 9 when the first of the two fingers 45 is ready to clear armature 82.

It should be noted that a pulse may arrive when the two fingers 45 and the stop plate 115 occupy the position shown in that figure. In that case, since stop plate 115 is not capable to retain the second of the fingers 45 from moving under armature 82 due to the energization of solenoid 81, both fingers will pass under armature 82 as shown in Figure 12 to engage in the required position the stationary switch members 31 to 38.

It would seem at this point that these two fingers 45 will now cause two pulses to appear at the output due to the fact that both fingers 45 will engage a stationary switch member such as 31. This is not the case since the two contact pins 53 and the two fingers 45 are now so close to each other that they will substantially cause a single pulse when they go into engagement with a stationary switch member such as 31.

Figure 8 shows a condition in which a first finger 45 moves against portion 105 of armature 82. If a pulse should come at this time, armature 82 will be energized and the first of the two fingers will be moved under armature 82 and after a very short interval of time, the condition shown in Figure 13 will occur, namely, the second finger 45 (see Figures 8 and 13) now comes into engagement with armature 82.

In between the position shown in Figure 8 and that shown in Figure 13, the stop plate 114 will be operated when its finger 114 engages pin 54 of the preceding finger 45 and after its operation it will become again inoperative so that the second finger 45 is engaged only by armature 82 as shown in Figure 13.

In order to clarify this operation of the memory device, Figure 7 shows a condition immediately preceding that of Figure 8, that is, when the first of the fingers 45 first comes in engagement with armature 82 while the second finger 45 has not yet been rotated in the position shown in Figure 8 by the cam or better gear mechanism 150 consisting of the rigid member 151 terminating in a gear surface 152.

Rotatable with respect to member 151 is the previously mentioned disc 55 carrying fingers 45 through their pins 46. Portion 51 of fingers 45 is provided with two complementary teeth 153 which engage the gear portion 152 of member 151 so that due to the motion of disc 55 with respect to member 151, finger 45 is caused to rotate (see Figures 7 and 8) in the clockwise direction by a certain number of degrees every time one of the fingers 45 engages the gear portion 152.

The function of gear mechanism 150 is to give the same initial position to all fingers 45 when they come in contact with armature 82 so as to provide a really accurate measurement of the time at which a pulse may have come in and energized armature 82.

In other words, since the angular position of fingers 45 determines the time at which a pulse was received by solenoid 81, the initial position of fingers 45 must be the same for all fingers.

In order to permit easy engagement of teeth 153 with the gear portion 152, fingers 45 before engagement with the gear portion 152 are made to rotate to an extreme position such as that shown in Figure 8 (see the finger at the extreme right of the drawing) so that the first of the teeth 153 may engage the single notch of gear portion 152.

To achieve this, a restoring member 160 secured to a support 161 mounted on base 21 through screws 162 extends in the path of fingers 45 and as shown in Figures 9, 10, 7, and 8 in this order, first engages a finger 45 that has carried the pulse information, starts to rotate it (Figure 10), continues further its rotation (Figure 7) always in the counterclockwise direction, continues still further its rotation in Figure 8 until finally the finger acquires a position such that it clears the edge 164 of restoring member 160.

After engagement (see Figure 7) finger **45*b* rotates around its pin 46** until it acquires the position shown in Figure 8.

Referring to Figure 7, it may appear that if electromagnet 80 is energized at the time corresponding to that shown in Figure 7, the first finger **45*a* having been rotated around its pin 46 by engagement with portion 105 of armature 82 will now retain its angular position and pass under the raised armature 82 while finger 45*b* has not yet reached portion 105 of armature 82**.

If a pulse should come at this time, it may then appear that such a pulse will be lost. That this cannot happen is easily seen by considering that in the present embodiment it will be seen that the pulses cannot arrive at a speed in excess of two per second and the fingers are in such a number and rotate at such a speed that the time distance between contiguous fingers is less than half a second.

Thus, if finger **45*a* should actually pass underneath armature 82 due to energization of electromagnet 81, no pulse can arrive to energize electromagnet 81 before at least three more of fingers 45 have come in contact with armature 82 without being energized. This means that either one or two of these fingers 45 will be in engagement with armature 82 when the next pulse arrives at the solenoid 81**.

In the operation as a delay unit, an input pulse energizes solenoid 81 attracting armature 82 against the bias of spring 131. This permits one of the fingers 45 to pass under armature 82 and thus carry the information of the pulse received.

The same pulse may then be reproduced at a later time, that is, with a certain time delay when the finger 45 carrying the pulse information or better its contact 53 engages the stationary switch members 31 to 38. For example, when the information carrying finger 45 comes in contact with switch 31, a pulse will be reproduced which has a time delay of one second with respect to the pulse input to the delay unit. Engagement with the second switch member 32 will produce a pulse delayed by one and one-half seconds with respect to the input pulse and so on. In this manner it will be possible to produce pulses having a desired delay with respect to an input pulse.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. In a memory delay unit for reproducing input pulses with a preset time delay, a memory unit comprising a disc carrying a plurality of peripheral equally spaced rotatable fingers, said disc being also rotatable about its axis, driving means for rotating said disc at a predetermined constant rate, electromechanical means engaging at least one of said fingers when electrically pulsed to rotate said fingers about their axis, output means arranged about said disc including contacts spaced to correspond with a plurality of desired time delays, the rotated fingers successively contacting with each of said contacts to establish corresponding pulses delayed by the said time delays, and means orienting said fingers into a predetermined angular setting on said disc prior to their reaching said electromechanical means.

2. In a memory delay unit for reproducing input pulses with preset time delays, a memory unit comprising a disc carrying a plurality of equally spaced fingers, driving means for rotating said disc about its axis at a predetermined rate, each of said spaced fingers being pivotally mounted on said disc and being movable between a first and second angular position, each of said fingers having an engaging portion extending outward from their pivotal axis, electromagnetic means positioned to selectively control the angular position of said fingers as said fingers are rotated therepast, said electromagnetic means including an armature member movable between a first and second position responsive to the application of an input pulse to said electromagnetic means, said armature being positioned to engage said engaging portion to rotate said fingers about their said pivotal axis to said second angular position when in one of said first or second armature positions and to leave said fingers in said second angular position when in the other of said first or second positions, and an output means concentric about said disc having predeterminedly spaced contacts successively electrically coactable with said fingers that are displaced angularly resultant from an input pulse to said electromagnetic means, whereby selected ones of said fingers are motivated to their displaced angular positions in correspondence with time spacings of successive pulses impressed upon said electromagnetic means, and corresponding pulses at desired time delays are derived from connections to said contacts.

3. The memory delay unit of claim 2 wherein said armature is normally biased to said first armature position to engage said engaging portion of said fingers to move said fingers to their said second angular position, said armature being moved to said second armature position responsive to energization of said electromagnetic means to allow fingers rotated therepast to be maintained in said first angular position for subsequent engagement of said output means.

4. The device of claim 2 wherein resetting means are positioned to engage each of said fingers for positioning each of said fingers in said first angular position prior to their passing said electromagnetic means.

5. The device of claim 4 wherein said armature is normally biased to said first armature position to engage said engaging portion of said fingers to move said fingers to their said second angular position, said armature being moved to said second armature position responsive to energization of said electromagnetic means to allow fingers rotated therepast to be maintained in said first angular position for subsequent engagement of said output means.

References Cited in the file of this patent

UNITED STATES PATENTS

| | | |
|---|---|---|
| 2,522,119 | Kaelin | Sept. 12, 1950 |
| 2,606,244 | Johnson | Aug. 5, 1952 |

FOREIGN PATENTS

| | | |
|---|---|---|
| 229,713 | Great Britain | Feb. 23, 1925 |